(12) United States Patent
Wada

(10) Patent No.: US 8,550,566 B2
(45) Date of Patent: Oct. 8, 2013

(54) SEAT BELT AND CONSTRUCTION MACHINE EQUIPPED THEREWITH

(75) Inventor: Hirofumi Wada, Shimotsuke (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/503,260

(22) PCT Filed: Mar. 22, 2011

(86) PCT No.: PCT/JP2011/056741
§ 371 (c)(1),
(2), (4) Date: Apr. 20, 2012

(87) PCT Pub. No.: WO2011/118556
PCT Pub. Date: Sep. 29, 2011

(65) Prior Publication Data
US 2012/0212029 A1    Aug. 23, 2012

(30) Foreign Application Priority Data

Mar. 23, 2010   (JP) ................. 2010-066823
Mar. 23, 2010   (JP) ................. 2010-066824

(51) Int. Cl.
*B60R 22/00*    (2006.01)

(52) U.S. Cl.
USPC ............................ 297/476; 297/480; 297/483

(58) Field of Classification Search
USPC .................... 297/483, 480, 475, 476
See application file for complete search history.

(56) References Cited

U.S. PATENT DOCUMENTS

| 3,583,764 A | | 6/1971 | Lohr et al. | |
|---|---|---|---|---|
| 4,915,413 A | | 4/1990 | Meyer | |
| 5,020,856 A | * | 6/1991 | George | 297/483 |
| 5,403,038 A | * | 4/1995 | McFalls | 280/808 |
| 5,733,013 A | * | 3/1998 | Brown | 297/483 |
| 2002/0067035 A1 | | 6/2002 | Ritters et al. | |
| 2002/0140279 A1 | | 10/2002 | Arditi et al. | |
| 2004/0155451 A1 | | 8/2004 | Xu | |
| 2004/0178668 A1 | | 9/2004 | Kassai et al. | |
| 2007/0046015 A1 | | 3/2007 | Tanaka et al. | |
| 2008/0030013 A1 | * | 2/2008 | Burghardt | 280/808 |
| 2009/0033077 A1 | | 2/2009 | Yamataki | |
| 2009/0322141 A1 | * | 12/2009 | Matsushita | 297/483 |

FOREIGN PATENT DOCUMENTS

| CA | 2 235 661 C | 1/1999 |
|---|---|---|
| CN | 1345277 A | 4/2002 |
| CN | 1519146 A | 8/2004 |

(Continued)

OTHER PUBLICATIONS

Office Action dated Nov. 21, 2012 issued in Canadian Application No. 2,777,651, 3 pages.

(Continued)

*Primary Examiner* — David Dunn
*Assistant Examiner* — Alexander Harrison
(74) *Attorney, Agent, or Firm* — Fish & Richardson P.C.

(57) ABSTRACT

A seat belt includes: a lap strap stretchable around the waist of an operator, in other words, laterally stretchable across a seat surface; an AL retractor that is configured to wind the lap strap; a shoulder strap stretchable from the shoulder to the waist of the operator, in other words, stretchable from an upper portion on one side of the backrest to a lower portion on the other side thereof; and an EL retractor that is configured to wind the shoulder strap.

7 Claims, 7 Drawing Sheets

(56) References Cited

FOREIGN PATENT DOCUMENTS

| | | |
|---|---|---|
| CN | 1521063 A | 8/2004 |
| CN | 1923578 A | 3/2007 |
| EP | 2 003 027 A2 | 12/2008 |
| JP | H06-262996 A | 9/1994 |
| JP | H09-226427 A | 9/1997 |
| JP | 2002-145002 A | 5/2002 |
| JP | 2004-123000 A | 4/2004 |
| JP | 2007-045189 A | 2/2007 |
| JP | 2009-35176 A | 2/2009 |
| JP | 2009-262645 A | 11/2009 |
| JP | 2010-58722 A | 3/2010 |

OTHER PUBLICATIONS

International Search Report dated Apr. 19, 2011 from International Application No. PCT/JP2011/056741, including English Translation, 2 pages.

European Search Report dated Mar. 11, 2013 from European Application No. 11759361.6, in English, 5 pages.

Office Action issued Apr. 3, 2013 in corresponding Chinese Patent Application No. 201180004279.5, including English translation, 10 pages.

* cited by examiner

SEAT BELT AND CONSTRUCTION MACHINE EQUIPPED THEREWITH

CROSS REFERENCE TO RELATED APPLICATIONS

This application claims priority to Application No. PCT/JP2011/056741, filed on Mar. 22, 2011, which application claims priority to Japanese Application No. 2010-066823 and Japanese Application No. 2010-066824, both filed on Mar. 23, 2010. The entire contents of the above applications are incorporated herein by reference in their entireties.

TECHNICAL FIELD

The present invention relates to a seat belt and a construction machine provided with the seat belt.

BACKGROUND ART

Typical, a seat mounted on a vehicle is provided with a three-point seat belt. Such a three-point seat belt includes a retractor that winds a strap (belt), feeds the strap and locks the strap in case of emergency. The retractor may be fixed to a pillar forming a vehicle frame, or may be fixed to a seat itself (i.e., a built-in retractor).

When the retractor is attached to the vehicle frame, an end of the belt fed from the retractor is also fixed to the vehicle frame with an anchor bolt or the like. The strap is attached with a tongue plate in the middle. The tongue plate is detachably inserted into a buckle fixed to the vehicle frame or the seat.

In contrast, when the retractor is fixed to the seat itself (i.e., a built-in retractor), the end of the belt is also fixed to the seat while the buckle into which the tongue plate is inserted is also fixed to the seat (for instance, see Patent Literatures 1 and 2).

However, many construction machines are typically equipped with a two-point seat belt. Even in the two-point seat belt, the retractor and the buckle are fixed to the vehicle frame, or fixed to a seat itself.

In recent years, there has been such an increasing demand as to apply a three-point seat belt to a construction machine vehicle in order to prevent an operator from being largely swung when sitting on a seat. Particularly, the three-point seat belt is effective in a high-speed operation in which a vehicle travels at a high speed.

CITATION LIST

Patent Literature(s)

Patent Literature 1 JP-A-9-226427
Patent Literature 2 JP-A-2004-123000

SUMMARY OF THE INVENTION

Problems to be Solved by the Invention

Although such a typical three-point seat belt is effective in the high-speed operation, the three-point seat belt rather deteriorates operability in a low-speed operation.

Since an operation lever for a working equipment of the construction machine is not operated in a wide range while the vehicle travels at a high speed, the three-point seat belt is effective for resisting an abrupt stop during travel of the vehicle or centrifugal force at rotation. However, during a low-speed travel of the vehicle or at a stop of the vehicle, for instance, when the operator performs lever operations of the working equipment while largely leaning forward, the shoulder strap from the shoulder to the waist may hamper the lever operations, thereby possibly lowering the operability.

An object of the invention is to provide a seat belt capable of firmly holding an operator and the like and maintaining a favorable operability, and a construction machine provided with the seat belt.

Means for Solving the Problems

A seat belt according to an aspect of the invention includes: a lap strap laterally stretchable across a seat surface of a seat; an automatic locking retractor (hereinafter, occasionally abbreviated as an AL retractor) that is configured to wind the lap strap; a shoulder strap stretchable from an upper portion of one side of a backrest of the seat to a lower portion of the other side thereof; and an emergency locking retractor (hereinafter, occasionally abbreviated as an EL retractor) that is configured to wind the shoulder strap.

Herein, the "AL retractor" refers to a retractor having a mechanism for automatically locking a strap at a current position by slightly retracting the strap that is previously pulled out to extend to a desired length.

The "EL retractor" refers to a mechanism for locking a strap only when detecting acceleration of a predetermined level or more in an emergency while holding the strap not strongly so as to avoid inhibiting a body movement of an operator of a construction machine and the like on normal occasions.

According to the above aspect of the invention, the AL retractor and the EL retractor are individually provided for the respective straps. Accordingly, the seat belt can function as a two-point seat belt when the lap strap fed from the AL retractor is only used, and can function as a three-point seat belt when the shoulder strap fed from the EL retractor is used together with the lap strap. Consequently, by selecting whether the seat belt functions as the two-point seat belt or the three-point seat belt depending on operational contents of a seated operator and movement of a vehicle and the like where the seat is provided, the operator can be reliably held without inhibiting operability of the operator.

The seat belt according to the above aspect of the invention further includes: a first tongue plate provided to the lap strap; a second tongue plate provided to the shoulder strap; and a buckle in which one of the first and second tongue plates is fit, in which the first and second tongue plates are mutually engaged.

According to the above aspect of the invention, the first and second tongue plates for the respective straps are mutually engageable. Accordingly, when the seat belt is dedicated to usage as the three-point seat belt, it is only necessary to insert one of the tongue plates into a single buckle while the tongue plates being kept engaged to each other, whereby it is not necessary to provide an individual buckle for each of the tongue plates. Moreover, since a single insertion operation is enough, handleability becomes favorable.

In the seat belt according to the above aspect of the invention, the automatic locking retractor and the emergency locking retractor are attached to the seat.

According to the aspect of the invention, since the AL retractor and the EL retractor are provided to the seat, a built-in seal belt integrated with the seat can be provided. Consequently, for application of the seat belt, it is only necessary to perform a strength test and the like on a single body of the seat including the seat belt. Even when the same kind of seat is provided in different kinds of vehicles, it is not necessary to perform a test on each of the different kinds of vehicles. Accordingly, the seat belt shows excellent versatility.

The seat belt according to the above aspect of the invention further includes a shoulder anchor attached to the seat, in which the shoulder anchor includes: an anchor plate fixed to the backrest of the seat; a support arm having a lower end fixed to the anchor plate and an upper end positioned above one of shoulders of an operator; and an insert portion provided near the upper end of the support arm and through which the shoulder strap is inserted, in which the anchor plate includes a planar portion to which the support arm is fixed and which is tightly bonded to a back portion of the backrest, the planar portion is provided with a rib which is formed on the planar portion along a vertical direction in a direction perpendicular to the planar portion, and lower ends of the planar portion and the rib are positioned near a support supporting the backrest.

As described above, the seat mounted on the vehicle is typically provided with a three-point seat belt. Such a three-point seat belt includes a retractor that winds a strap (belt), feeds the strap and lock the strap in case of emergency. The retractor is fixed to a pillar forming a vehicle frame, or fixed to a seat itself (i.e., a built-in retractor: see Patent Literatures 1 and 2 described above).

When the retractor is fixed to the seat itself (i.e., a built-in retractor), the end of the belt is also fixed to the seat while the buckle into which the tongue plate is inserted is also fixed to the seat. In other words, an overall assembly of the seat belt is attached to the seat in the built-in retractor. Accordingly, in plural kinds of vehicles having different structures of the vehicle frame, a seat designed in the same manner is easily applicable to different kinds of vehicles without changing a position of the retractor and the like. Moreover, since strength calculation and the like are completed by performing those on a single body of the seat, it is unnecessary to perform strength check of the seat after being mounted on the different kinds of vehicles.

In the seat with a built-in three-point seat belt, the shoulder anchor is attached to the back of a backrest such that a shoulder strap passes over the shoulder of the operator. Accordingly, a pulling force in a direction slantwise from the shoulder, which is generated on the shoulder strap, acts on an anchor portion (i.e., a fixed portion of the shoulder anchor) of the backrest via the shoulder anchor, so that an upper part of the backrest is pulled forward to be deformed.

Moreover, such a pulling force generated on the shoulder strap may cause twist of the overall seat including the backrest. In such a case, a slider to slide the seat back and forth may be twisted, so that back-and-forth positional adjustment of the seat may become impossible.

On the other hand, according to the above aspect of the invention, the pulling force on the shoulder strap transmitted through a support arm is dispersible over a planar portion of the anchor plate of the shoulder anchor to be transmitted to the back portion of the backrest. Consequently, stress concentration at the anchor portion is avoided to prevent the seat from deforming (e.g., bending forward at the backrest).

Since the planar portion is provided with a rib and a lower end of the rib is positioned near the support, rigidity of the anchor plate is improved to inhibit deformation thereof. In addition, a twist force to be transmitted through the support arm and the anchor plate is receivable by the highly strong support located near the support arm and the anchor plate to inhibit such twist of the backrest, thereby preventing deformation caused by the twist force.

In the seat belt according to the above aspect of the invention, the rib of the shoulder anchor is continuously formed over a full length of the planar portion in a vertical direction.

According to the above aspect of the invention, since the rib is continuously formed over a full length of the planar portion in a vertical direction, the rigidity of the anchor plate is enhanced and the twist force is reliably transmittable to the support without apparent deformation of the anchor plate.

In the seat belt according to the above aspect of the invention, the rib of the shoulder anchor conforms to a side surface of the backrest.

According to the above aspect of the invention, since the rib conforms to the side surface of the backrest, the anchor plate can be naturally attached to the backrest to provide a good appearance of the seat.

In the seat belt according to the above aspect of the invention, the support arm of the shoulder anchor is provided with a slant portion that extends upward in a slantwise direction from the back portion to a position where the slant portion comes above one of shoulders of the operator.

According to the above aspect of the invention, since the support arm has the slant portion, even when the lower end of the support arm is positioned near the center in a lateral direction of the backrest (back portion), the slant portion enables a distance between the lower end and the upper end to be short, thereby simplifying the structure. Further, since the lower end comes near the center of the backrest, the planar portion can be enlarged and the support arm can be fixed near the center, thereby reducing unbalance of stress generation on the backrest.

A construction machine according to another aspect of the invention includes the seat belt according to any one of the seat belts described above.

DESCRIPTION OF EMBODIMENT(S)

Figure 1:
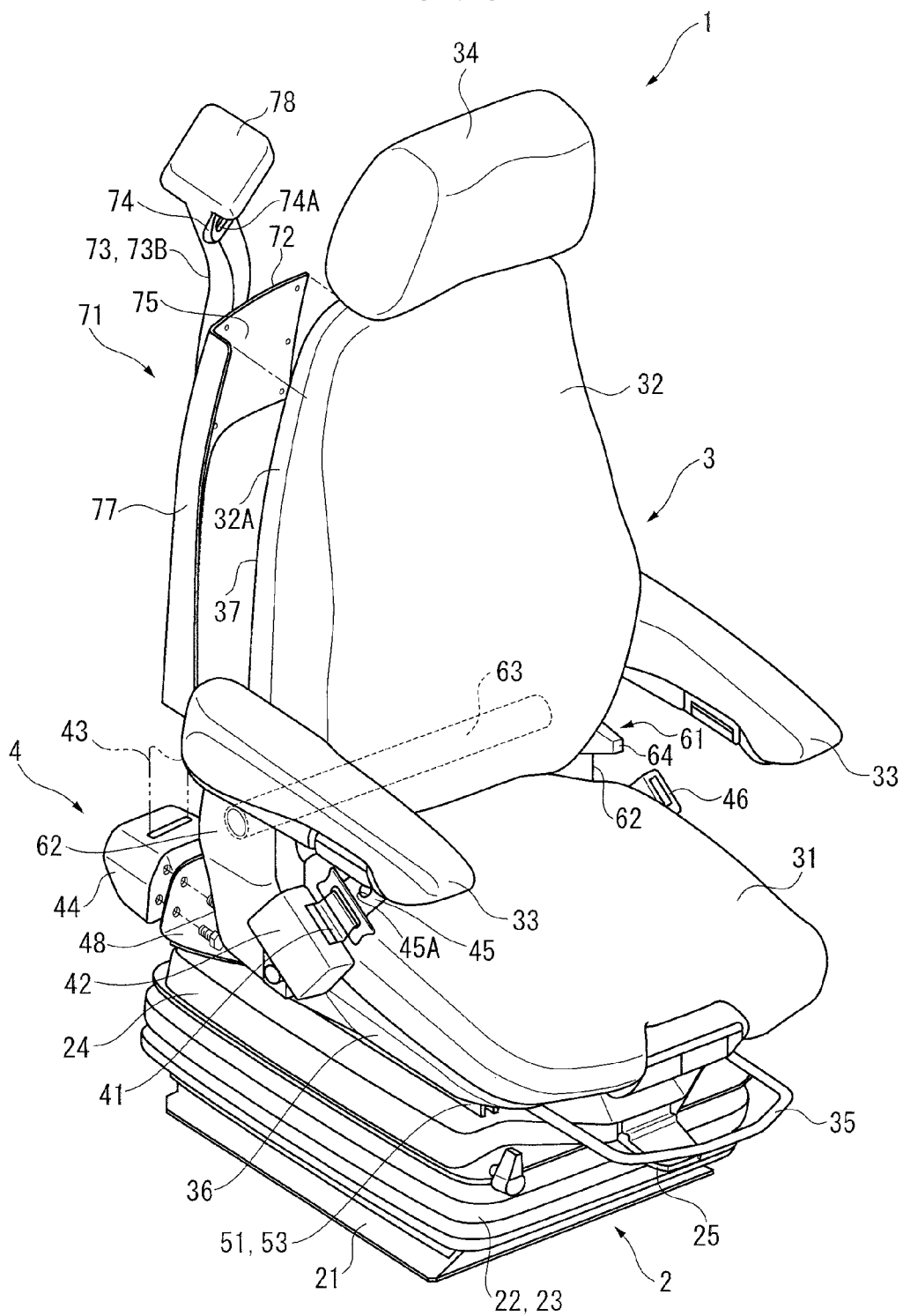
FIG. 1 is an overall exploded perspective view showing a seat attached with a shoulder anchor of a three-point seat belt according to an exemplary embodiment of the invention.

An exemplary embodiment of the invention will be described below with reference to the attached drawings.

In FIGS. 1 to 4, a seat 1 according to this exemplary embodiment is provided in a construction machine (not shown) such as a wheel loader, a hydraulic excavator and a bulldozer. The seat 1 is applicable to both a construction machine including a cab having a box-shaped operating area and a construction machine including a canopy having a roof.

The seat 1 includes a suspension equipment 2 fixed to a floor of the construction machine, a seat body 3 mounted on the suspension equipment 2, and a built-in three-point seat belt 4.

The suspension equipment 2 includes: a base frame 21 that is made of a steel plate and is fixed to a floor frame of the floor by bolts or the like; and an equipment body 22 that is attached on the base frame 21. The equipment body 22 is entirely covered with bellows 23 made from synthetic rubber.

Although not shown, a link mechanism vertically extensible from a base of the base frame 21, an attachment board 24 attached on an upper side of the link mechanism, and a hydraulic damper that biases the attachment board 24 upward for support and absorbs vertical vibration for damping are provided in the bellows 23. The attachment board 24 includes a height position adjustment lever 25 that adjusts a height position of the seat body 3 by restricting and releasing an extension movement of the link mechanism.

The seat body 3 includes a seat surface 31 and a backrest 32. Arm rests 33 are rotatably provided on both right and left sides of the backrest 32. A headrest 34 is vertically-slidably provided on the backrest 32 through a guide member. A pair of slide rails 51 are attached to a lower surface of the seat surface 31 on the right and left sides thereof.

The slide rails 51 are configured such that an inner member 52 and an outer member 53 are combined to be slidable in back-and-forth directions through a steel ball. For instance, the inner member 52 is fixed to the attachment board 24 and the outer member 53 is attached to the seat surface 31. The seat surface 31 includes a front-back position adjustment lever 35 that restricts and releases the movement of the seat body 3 on the slide rails 51. The backrest 32 is capable of being reclined relative to the seat surface 31 by a reclining mechanism 61.

The reclining mechanism 61 includes supports 62 on both right and left sides of the seat surface 31. The backrest 32 is reclined around a shaft 63 bridging the supports 62. Accordingly, the supports 62 function as a support for the entire backrest 32 with a high strength. In this arrangement, the backrest 32 is locked at any reclined position by two locking mechanisms (not shown) provided at both ends of the shaft 63.

The locking mechanisms are connected with each other and also connected with a reclining lever 64 provided on one of the locking mechanisms (e.g., on the left side of a seated operator in this exemplary embodiment). Since the three-point seat belt 4 is provided to the seat 1 according to the exemplary embodiment, twist in a direction slantwise from the shoulder is generated when the operator wears the seat belt 4. In order to favorably counteracting this twist, the locking mechanisms are provided on both ends of the shaft 63.

A bottom of the seat surface 31 is provided as a bottom 36 formed by press molding and the like of a sheet metal. The supports 62 formed of a metal plate and the like are fixed to the bottom 36 by welding and the like.

A back of the backrest 32 is provided as a back portion 37 formed by press molding and the like of a sheet metal. In this exemplary embodiment with the three-point seat belt 4, a metallic shoulder anchor 71 is fixed to the back portion 37. The shoulder anchor 71 will be described in detail later.

The seat belt 4 includes: a lap strap 41 that is stretchable around the waist of the operator, in other words, laterally stretchable across the seat surface 31; an automatic locking retractor (ALR) (hereinafter referred to as an AL retractor) 42 that is configured to wind, feed and lock the lap strap 41; a shoulder strap 43 that is stretchable from the shoulder to the waist of the operator, in other words, stretchable from an upper portion on one side of the backrest 32 to a lower portion on the other side thereof in a direction slantwise from the shoulder; an emergency locking retractor (ELR) (hereinafter referred to as an EL retractor) 44 that is configured to wind, feed and lock the shoulder strap 43; and the shoulder anchor 71 attached to the seat 1.

The lap strap 41 and the AL retractor 42, which are substantially configured in the same manner as a typical two-point seat belt, are usable independent of the shoulder strap 43 and the EL retractor 44 or usable together with the shoulder strap 43 and the EL retractor 44. A main tongue plate 45 is attached to an end of the lap strap 41. By inserting the main tongue plate 45 into a buckle 46 on the left for engagement, the lap strap 41 and the AL retractor 42 are usable as a two-point seat belt.

Although the lap strap 41 only holds the waist of the operator, even when the lap strap 41 is used as a two-point seat belt, the lap strap 41 can firmly hold the operator in a lever operation for a working equipment during a low-speed travel of a construction machine vehicle and in a lever operation while the vehicle stops. In addition, no use of the shoulder strap 43 facilitates a lever operation in an attitude of the operator leaning forward. The AL retractor 42 is fixed on the right side of the metallic bottom 36 forming the seat surface 31 via a suitable bracket.

The shoulder strap 43 is fed from the EL retractor 44 on the lower side and is inserted through the shoulder anchor 71 positioned above the right shoulder of the operator. Different from a typical three-point seat belt, a sub tongue plate 47 is provided at an end of the shoulder strap 43. A hook 47A is provided at an end of the sub tongue plate 47.

Figure 2:
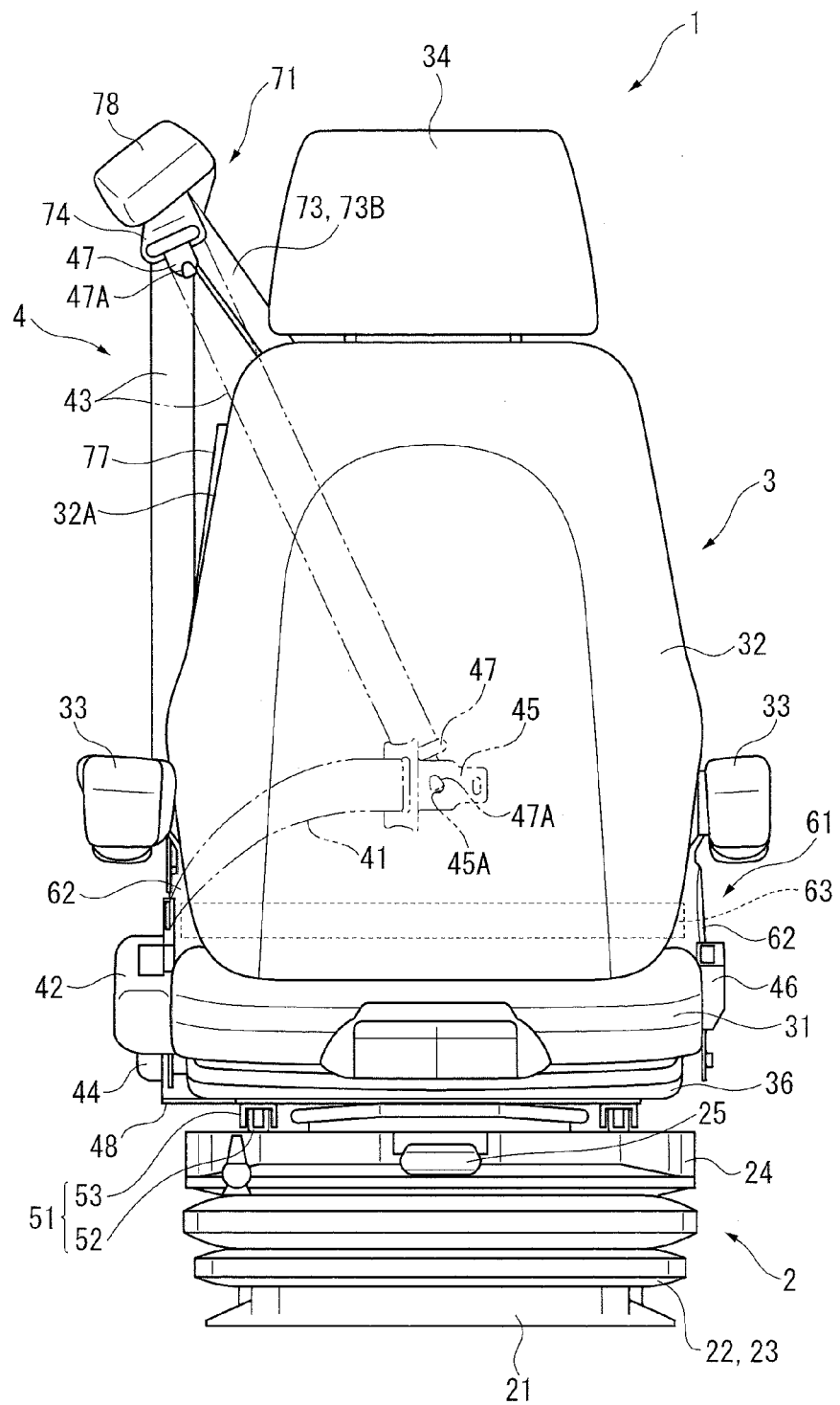
FIG. 2 is a front view of the seat.
Figure 3:
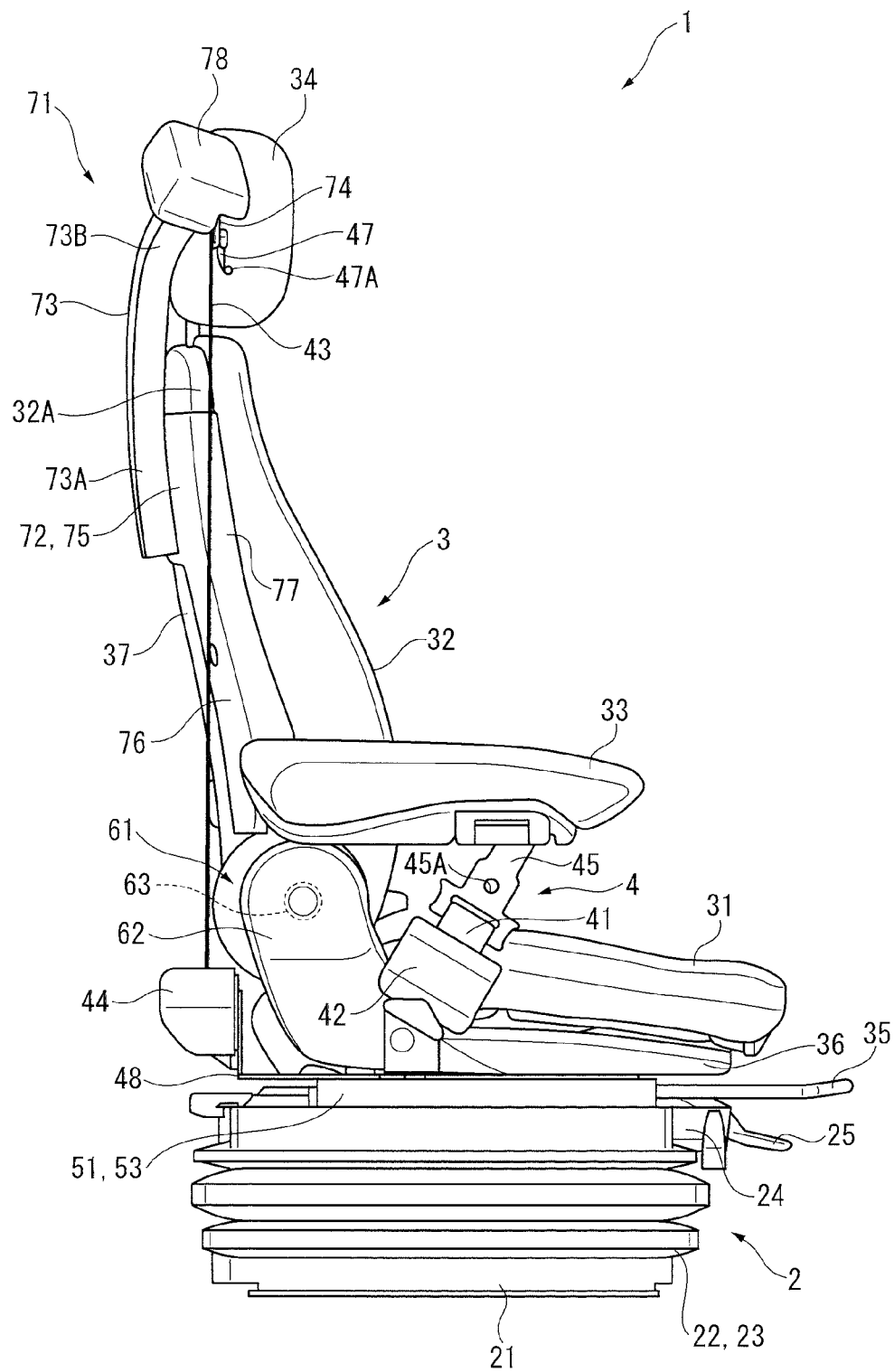
FIG. 3 is a side view of the seat.
Figure 4:
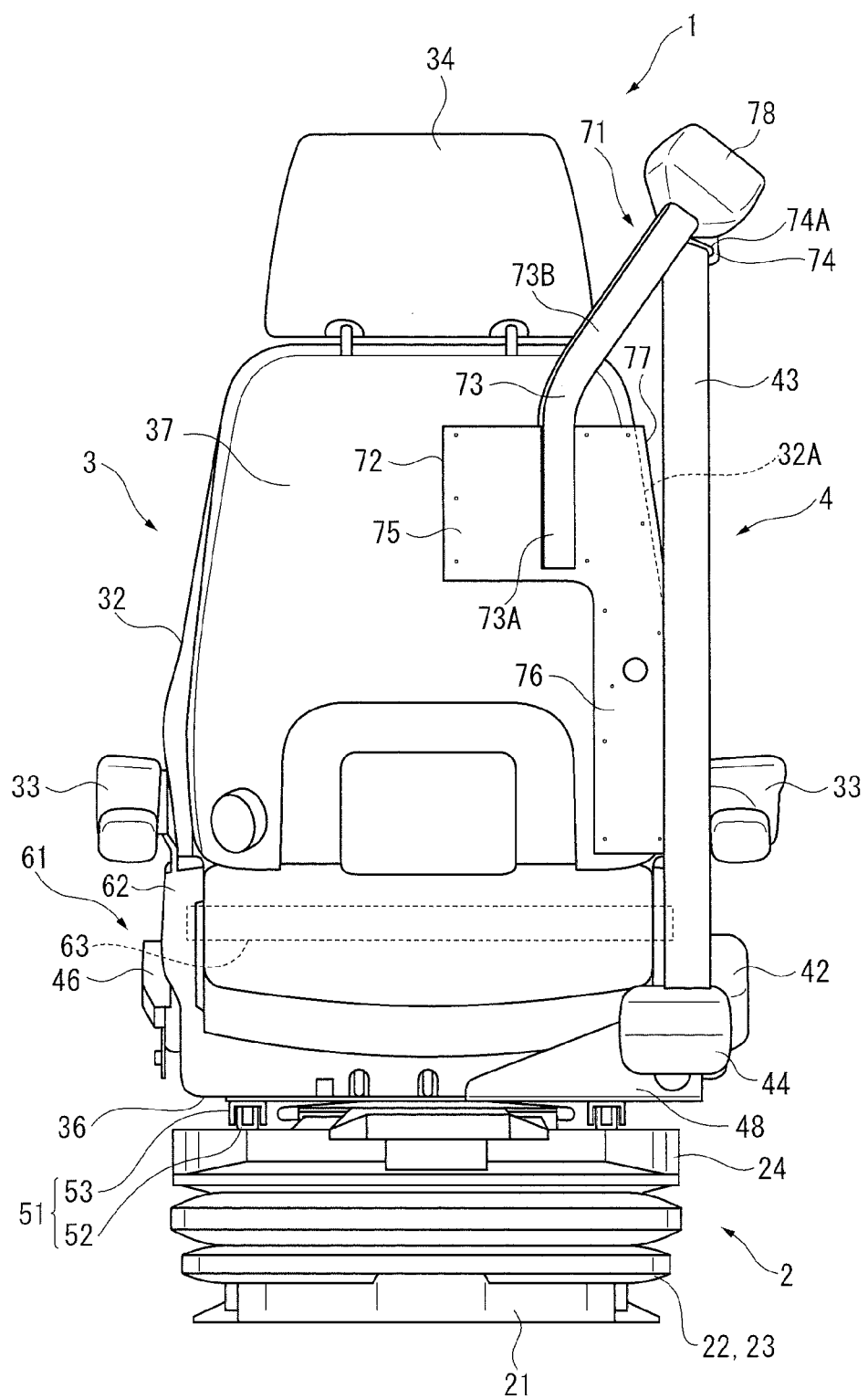
FIG. 4 is a rear view of the seat.

As shown by a two-dot chain line in FIG. 2, the hook 47A is engaged with a hole 45A of the main tongue plate 45. When the straps 41 and 43 are thus united, the seat belt 4 functions as a three-point seat belt by co-operation of the straps 41 and 43 and the retractors 42 and 44.

When the construction machine vehicle travels at a relatively high speed on an uneven ground or operates on a forward slope, the operator may be largely swung or may lean forward along the slope. Accordingly, the operator can be favorably held when the seat belt 4 is used as a three-point seat belt. The EL retractor 44 is fixed on the rear right side of the bottom 36 via an L-shaped bracket 48.

The EL retractor 44 is fixed to the bracket 48 by bolts or the like. However, for instance, when a two-point seat belt sufficiently serves as the seat belt, in other words, the seat belt is not required to function as a three-point seat belt, it may be possible not to attach the shoulder strap 43, the EL retractor 44, and the shoulder anchor 71 in advance. In contrast, the function of a three-point seat belt may be added by attaching those components to the seat belt later.

As described above, in this exemplary embodiment, the seat belt 4 is usable as a two-point seat belt and a three-point seat belt. Both holding performance and operability of the seat belt 4 can be satisfied by selecting a two-point seat belt or a three-point seat belt as needed depending on operational conditions.

Since the straps 41 and 43, the retractor 42 and 44, and the shoulder anchor 71 are provided to the seat 1, the built-in seat belt 4 is easily applicable to a plurality of different kinds of construction machines. In this arrangement, particularly, the EL retractor 44 is attached to the seat surface 31 of the seat body 3, not to the suspension equipment 2. Accordingly, even when the vehicle heavily moves up and down on an uneven ground, the EL retractor 44 moves up and down together with the seat body 3. Such an up-down movement of the EL retractor 44 can keep the shoulder strap 43 from being unnecessarily locked and maintain a favorable condition of holding the operator.

Since the AL retractor 42 is used for holding the waist of the operator, a feeling of the operator being bound by the seat belt 4 can be avoided by drawing out the lap strap 41 to a slightly longer length to lock the lap strap 41. Particularly, during a low-speed operation with the seat belt 4 serving as a two-point seat belt, the operator can easily change his/her attitude for operation and does not feel bothered.

Supposing that the EL retractor is used for holding the waist of the operator, the EL retractor cannot firmly hold the waist during a low-speed travel on an uneven ground where acceleration of a predetermined value or more to activate a locking mechanism is less likely to be generated. However, even under such conditions, usage of the AL retractor 42 enables firm holding.

Since the EL retractor 44 is used for holding the shoulder, when the operator wears a seat belt as a three-point seat belt, the seat belt allows the operator to be firmly held in an emergency while leaning forward.

Figure 5:
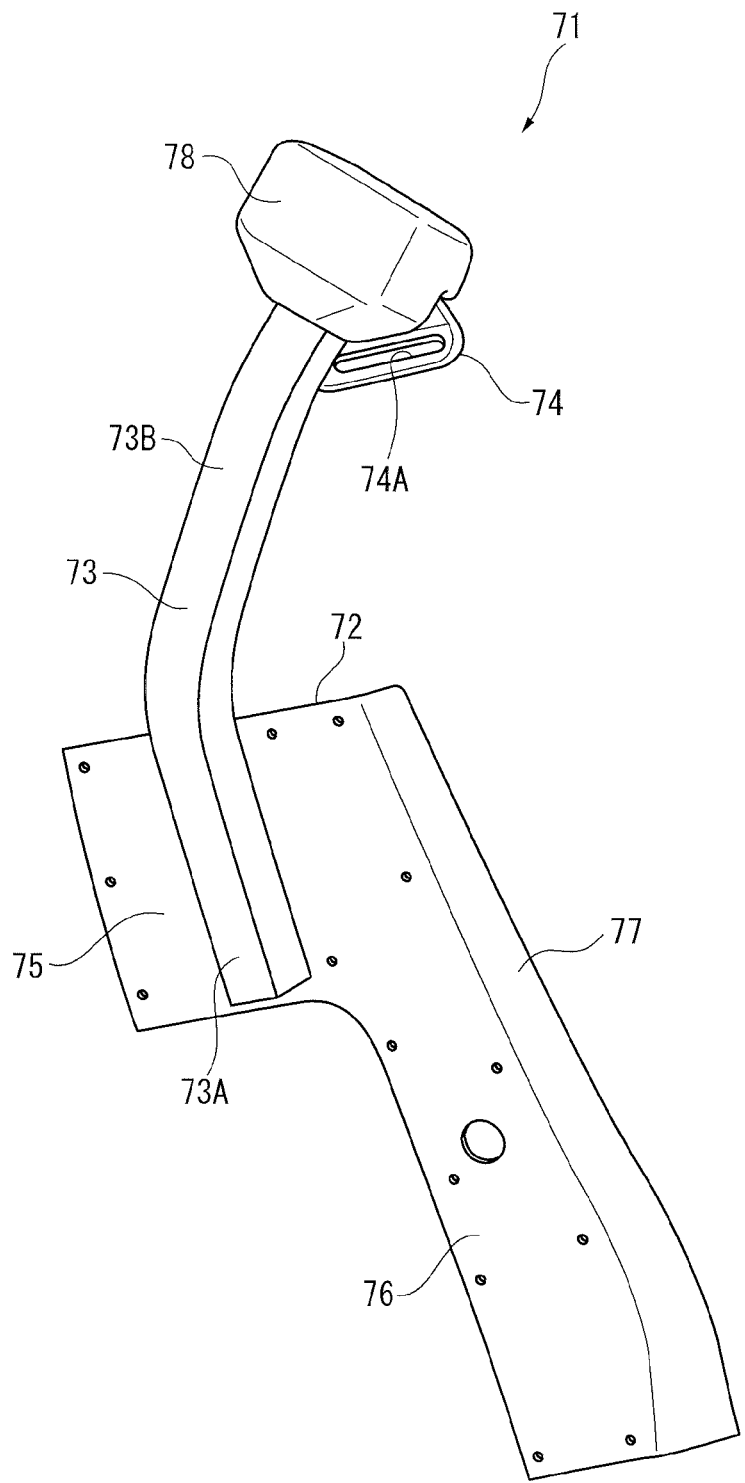
FIG. 5 is a perspective view of the shoulder anchor.

The shoulder anchor 71 according to this exemplary embodiment will be described in detail below with reference to FIG. 5. In FIGS. 1, 3 to 5, the metallic shoulder anchor 71 includes: an anchor plate 72 fixed to the back portion 37 of the backrest 32 with a rivet or the like; a support arm 73 in a form of a rod which is fixed to the anchor plate 72 by welding or the like; and a suspending member 74 that is swingably attached to an upper end of the support arm 73 and through which the shoulder strap 43 is inserted.

Among the above components, the anchor plate 72 provides an anchor portion (a fixed portion) of the shoulder anchor 71 to the backrest 32 and is shaped to vertically cover the right-side portion of the back portion 37. Specifically, the anchor plate 72 is formed by: a first planar portion 75 on which the support arm 73 is fixed; a second planar portion 76 that is pendent from a right lower portion of the first planar portion 75; and a rib 77 that is formed continuously from right edges of the first and second planar portions 75 and 76 in a direction perpendicular to the first and second planar portions 75 and 76.

The first planar portion 75 is provided between the middle of the back portion 37 and a right side surface 32A of the backrest 32. A vertical dimension of the first planar portion 75 is approximately equivalent to that of a vertical portion 73A of the support arm 73. An upper edge of the first planar portion 75 is located near an upper portion of the back portion 37. With this arrangement, the first planar portion 75 is tightly bonded to the back portion 37 in a large area with a rivet or the like. Accordingly, even when the support arm 73 is to be bent forward by the pulling force generated on the shoulder strap 43 in a direction slantwise from the shoulder, stress at the anchor portion generated by the pulling force can be favorably dispersed over the first planar portion 75. Consequently, the first planar portion 75 can reliably resist the force attempting to bend the support arm 73, thereby preventing the backrest 32 from being deformed forward.

In addition, the second planar portion 76, which is integrated with the first planar portion 75 and extends downward, extends near the support 62 integrated with the seat surface 31. With the arrangement in which the second planar portion 76 is tightly bonded to the back portion 37, the stress generated in the anchor portion is widely dispersed over the backrest 32 in a vertical direction thereof. Accordingly, the stress concentration at the anchor portion is further unlikely and the deformation of the backrest 32 is more reliably prevented.

The rib 77 is bent forward relative to the first and second planar portions 75 and 76 in a predetermined width and stretches for a full length of the first and second planar portions 75 and 76 in the vertical direction. A lower end of the rib 77 is also located near the support 62 similarly to that of the second planar portion 76. The rib 77 conforms to the right side surface 32A of the backrest 32 to neatly fit the right side surface 32A.

Since such a rib 77 is provided, rigidity of the anchor plate 72 is significantly improved and the anchor plate 72 can favorably resist force in a twist direction generated at the shoulder strap 43 by the pulling force to inhibit such a twist force from being transmitted to the backrest 32. Since the anchor plate 72 is not deformed, the twist force acting on the anchor plate 72 is transmitted to the highly strong support 62 directly under the anchor plate 72. Since such a twist force is reliably received by the support 62, large twist of the backrest 32 can be prevented and deformation of the reclining mechanism 61, the slide rails 51 and the like can be prevented.

The support arm 73 is formed by bending a hollow prismatic member. The support arm 73 includes: a vertical portion 73A fixed to the first planar portion 75 of the anchor plate 72; and a slant portion 73B extending upward in a slantwise direction relative to the vertical portion 73A to a position where an upper end of the slant portion 73B comes above the right shoulder of the operator. A protector 78 protecting an end is attached to the upper end of the support arm 73 without forming edges. The suspending member 74 is also attached to the upper end of the support arm 73.

The suspending member 74 is a triangular plate member, an apex portion of which is swingably attached to the end of the support arm 73 by bolts member or the like. An insert portion 74A is a slit in parallel to a bottom line of the suspending member 74 and is provided at a bottom line portion of the suspending member 74. The shoulder strap 43 is inserted through the insert portion 74A. The insert portion 74A is smaller than the sub tongue plate 47 of the shoulder strap 43 in size. Accordingly, under the condition where the shoulder strap 43 is not used, the sub tongue plate 47 is engaged with the suspending member 74 by a winding force from the EL retractor 44 via the shoulder strap 43.

The scope of the present invention is not restricted to the above-described embodiment, but includes modifications and improvements as long as an object of the invention can be achieved.

Figure 6:
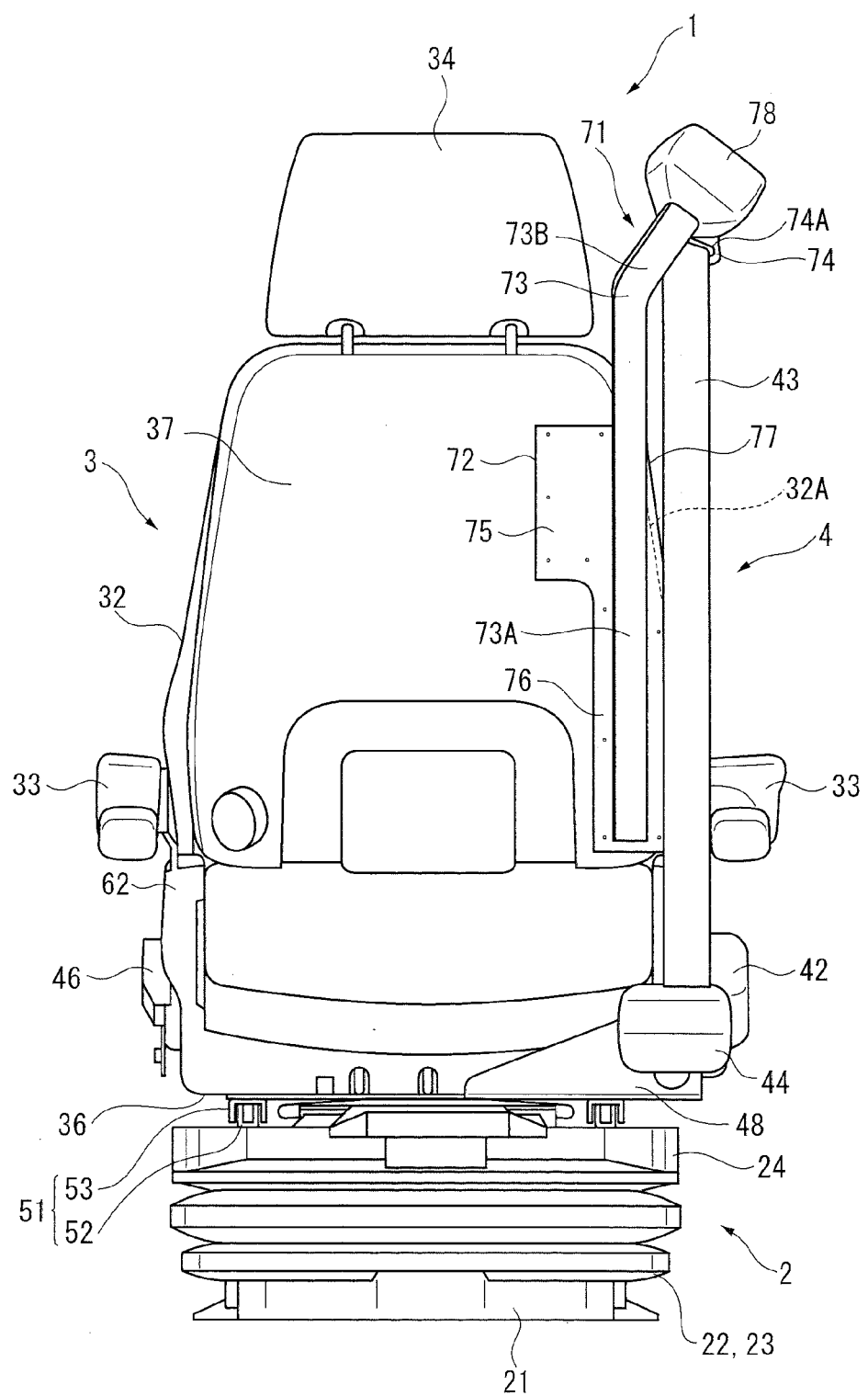
FIG. 6 is a rear view showing a modification of the invention.

For instance, in the above exemplary embodiment, the support arm 73 of the shoulder anchor 71 is fixed to the anchor plate 72 substantially in the middle of the first planar portion 75 in a width direction to have substantially the same length as a length of the first planar portion 75 in a vertical direction. However, the arrangement of the support arm 73 is not limited thereto. As shown in FIG. 6, the support arm 73 may be fixed to the anchor plate 72 substantially in the middle of a width direction of the second planar portion 76 to have substantially the same length as lengths of the first and second planar portions 75 and 76 in the vertical direction. Even with this arrangement, the stress concentration at the anchor portion can be avoided and the twist force can be sufficiently resisted. The width of the first planer portion 75 can be decreased to an extent where dispersion of the stress is not hampered. It is desirable that the support arm 73 is not interfered with the shoulder strap 43 when located at a further outside in a lateral direction.

Figure 7:
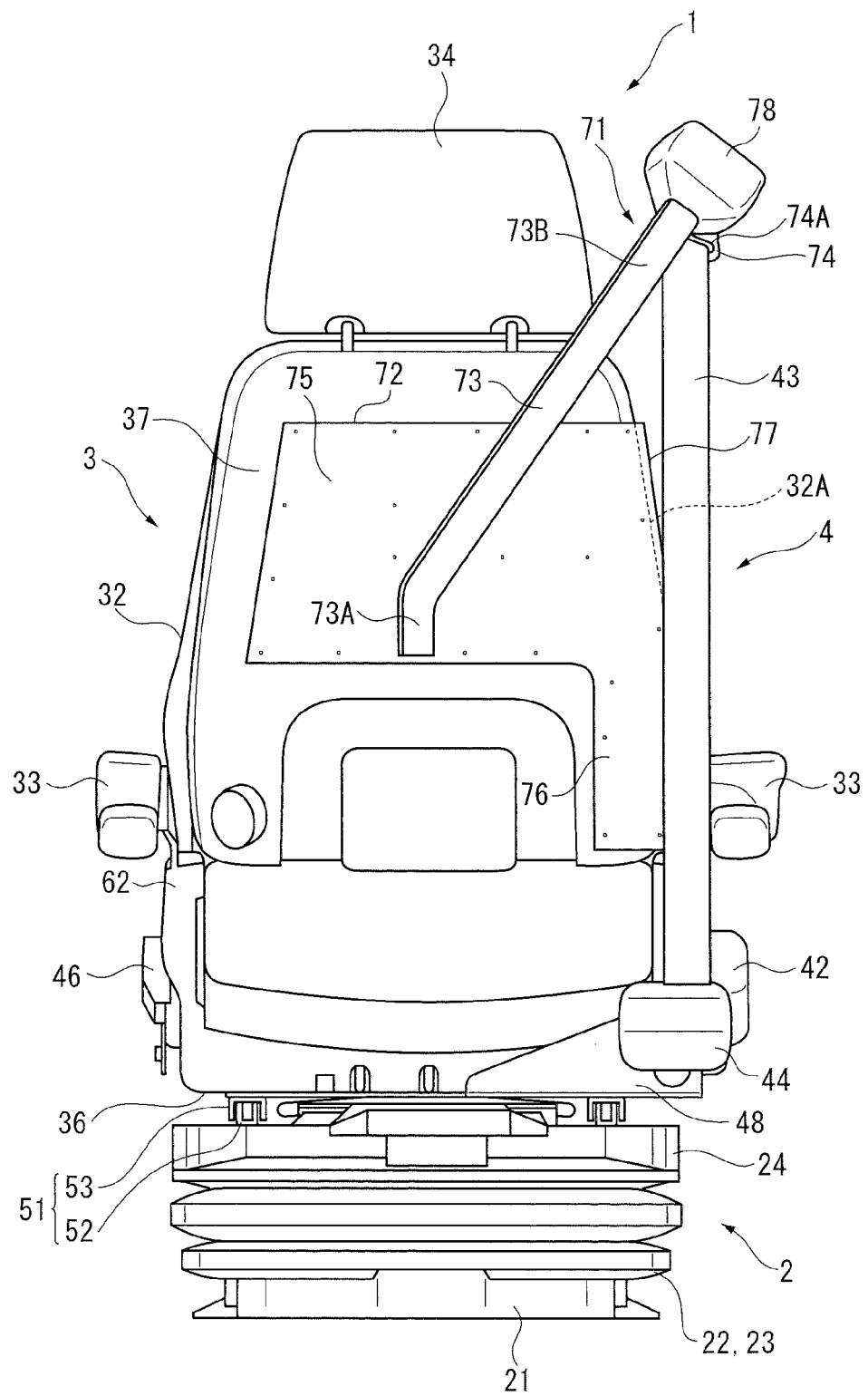
FIG. 7 is a rear view showing another modification of the invention.

To the contrary, in a modification shown in FIG. 7, the slant portion 73B of the support arm 73 reaches near the center of the back portion 37 in the lateral direction and the lower half of the support arm 73 is entirely fixed to the first planar portion 75 of the anchor plate 72. According to this arrangement of the support arm 73, the width of the first planar portion 75 is increased, so that the first planar portion 75 is brought in tight bond to the back portion 37 in a larger area to further favorably disperse the stress.

In the above exemplary embodiment, the sub tongue plate 47 is arranged to be engaged with the main tongue plate 45 and a single buckle is provided as the buckle 46 to be engaged with the main tongue plate 45. However, a buckle to be engaged with the sub tongue plate 47 and a buckle to be engaged with the main tongue plate 45 may be independently provided at the same time, or a single buckle having a pair of engagement portions for the respective tongue plates 45 and 47 may be used.

In the above exemplary embodiment, both the AL retractor 42 and the EL retractor 44 are provided on the seat 3. However, both or one of the AL retractor 42 and the EL retractor 44 may be provided on the frame of the vehicle. In other words, the seat belt of the invention is not limited to a built-in seat belt.

In the above exemplary embodiment, in the shoulder anchor 71, the insert portion 74A through which the shoulder strap 43 is inserted is provided in the suspending member 74. However, since such an insert portion is only required to be located near the upper end of the support arm 73, the insert portion 74A may be provided, for instance, in a part of the protector 78, whereby the suspending member 74 may be omitted.

In the above exemplary embodiment, the respective retractors 42 and 44 of the seat belt 4 are positioned on the right seen from the seated operator. However, the invention also encompasses an arrangement of the retractors 42 and 44 on the left.

The invention claimed is:

1. A seat belt for a construction machine, the seat belt being provided in the construction machine, comprising:
   a lap strap laterally stretchable across a seat surface of a seat;
   an automatic locking retractor that is configured to wind the lap strap laterally stretchable across the seat surface of the seat;
   a shoulder strap stretchable from an upper portion of one side of a backrest of the seat to a lower portion of the other side thereof;
   an emergency locking retractor that is configured to wind the shoulder strap; and
   a shoulder anchor attached to the seat, wherein
   the shoulder anchor comprises:
      an anchor plate fixed to the backrest of the seat;
      a support arm having a lower end fixed to the anchor plate and an upper end positioned above one of shoulders of an operator; and
      an insert portion provided near the upper end of the support arm and through which the shoulder strap is inserted, wherein
      the anchor plate comprises a planar portion to which the support arm is fixed and which is tightly bonded to a back portion of the backrest,
      the planar portion is provided with a rib which is formed on the planar portion along a vertical direction in a direction perpendicular to the planar portion, and
      lower ends of the planar portion and the rib are positioned near a support supporting the backrest.

2. The seat belt for the construction machine according to claim 1, further comprising:
   a first tongue plate provided to the lap strap;
   a second tongue plate provided to the shoulder strap; and
   a buckle in which one of the first and second tongue plates is fit, wherein
   the first and second tongue plates are mutually engaged.

3. The seat belt for the construction machine according to claim 1, wherein
   the automatic locking retractor and the emergency locking retractor are attached to the seat.

4. The seat belt for the construction machine according to claim 1, wherein
   the rib of the shoulder anchor is continuously formed over a full length of the planar portion in the vertical direction.

5. The seat belt for the construction machine according to claim 1, wherein the rib of the shoulder anchor conforms to a side surface of the backrest.

6. The seat belt for the construction machine according to claim 1, wherein
   the support arm of the shoulder anchor is provided with a slant portion that extends upward in a slantwise direction from the back portion to a position where the slant portion comes above one of shoulders of the operator.

7. A construction machine comprising the seat belt for the construction machine according to claim 1.

* * * * *